Oct. 31, 1950     G. P. DAIGER     2,527,708
ELECTRIC TOASTER

Filed Dec. 31, 1946     4 Sheets-Sheet 1

INVENTOR.
George P. Daiger
BY Harry S. Dmarss
ATTORNEY.

Oct. 31, 1950    G. P. DAIGER    2,527,708
ELECTRIC TOASTER
Filed Dec. 31, 1946    4 Sheets-Sheet 2

INVENTOR.
George P. Daiger
BY Harry S. Dumass
ATTORNEY.

INVENTOR.
George P. Daiger
BY
Harry S. Dumarse
ATTORNEY.

Oct. 31, 1950     G. P. DAIGER     2,527,708
ELECTRIC TOASTER

Filed Dec. 31, 1946     4 Sheets-Sheet 4

INVENTOR.
George P. Daiger
BY
Harry S. Dumarse
ATTORNEY.

Patented Oct. 31, 1950

2,527,708

UNITED STATES PATENT OFFICE 2,527,708

ELECTRIC TOASTER

George P. Daiger, Canton, Ohio, assignor to The Hoover Company, North Canton, Ohio, a corporation of Ohio Application December 31, 1946, Serial No. 719,479

14 Claims. (Cl. 99—329)

The present invention relates to electric bread toasters and more particularly to a thermal timing mechanism for timing the duration of the toasting period whereby the operator may obtain toast cooked exactly as he or she desires.

In the past it has been usual practice to time the toasting operation by a clockwork mechanism. Clock timers have the defect that the toasting time is fixed and accordingly the bread is progressively toasted more and more for each succeeding toasting operation because the toaster itself is hotter for each succeeding toasting operation especially when the succeeding operations follow each other in rapid succession.

An attempt has been made to overcome this difficulty by providing a compensating thermostat to speed up the operation of the clockwork mechanism for each succeeding toasting operation.

Such timers have been unsatisfactory because of their complexity and of their unreliableness in operation.

As a result thermal timers have been developed. Thermal timers inherently are self-compensating in that the timer as a whole also becomes progressively hotter for each succeeding toasting operation and accordingly shortens the toasting period for each succeeding operation.

It has been found, however, that thermal timers have a tendency to over-compensate. That is, for each succeeding toasting operation, the toast is cooked progressively less and less for any particular timer setting.

This result comes about by reason of the fact that heat is stored in the parts of the thermal timer from the preceding toasting operation and as a consequence the timer becomes hotter and hotter at the start of each succeeding toasting operation. This causes the thermally responsive element of the timer to act faster and faster for each succeeding toasting operation.

According to the present invention, this difficulty is remedied by cooling the thermal timer after each toasting operation so that the succeeding toasting operation will not be initiated until the thermally responsive element of the timer is at the proper temperature to properly time the succeeding toasting operation.

The prior art teaches the preliminary cooling of a thermal timer before the next succeeding toasting operation can be initiated.

However, in the prior art devices, it has been necessary for the operator to wait until the timer has cooled before the next succeeding toasting operation can be initiated.

According to the present invention the operator can immediately insert new slices to be toasted after a prior toasting operation without waiting for the thermal timer to cool. The succeeding toasting operation will then proceed automatically without any further attention from the operator.

In prior devices the cooling unit has been fixed relative to the thermal element and the thermal element moves into contact with the cooling unit as it is heated to end each toasting interval.

According to the present invention, the cooling unit is movable relative to the thermal element. If the thermally responsive element is at the proper temperature for successful operation, the cooling means never contacts it. However, if the thermally responsive element is too hot the cooling unit is moved into contact therewith at the start of the toasting period and the toast carriers latched in lowered position immediately. As a result the timing element is properly conditioned for successful operation at the start of each toasting period and the toasting period automatically proceeds without any further attention from the operator.

It is known in prior devices to heat a bimetal timing element by an auxiliary heater energized simultaneously with the main heaters and to direct the heat from the auxiliary heater to the bimetal timer by means of a reflector.

According to this invention, heat is directed from an auxiliary heater to a bimetal timer by means of a reflector and the amount of heat so directed is varied by a shield which is movable to and from a position between the heater and the bimetal so as to control the amount of heat directed to the bimetal and thus control the toasting period for light, medium and dark toast.

Further objects and advantages of this invention will become apparent as the description proceeds when taken in connection with the accompanying drawings, in which.

Figure 1:
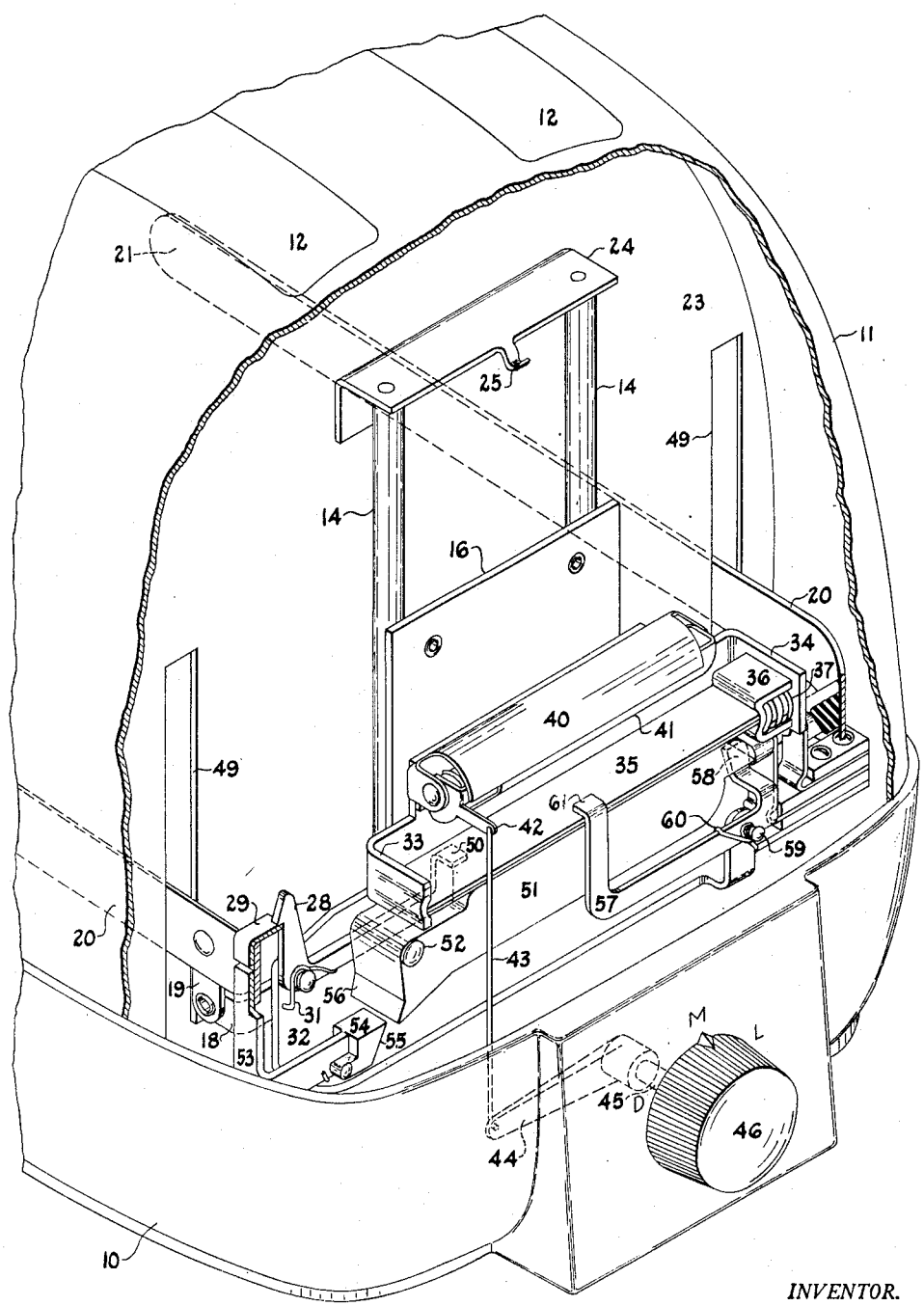
Figure 1 is a perspective view of a toaster with the timing mechanism of this invention applied thereto with the parts broken away to better show the details of the timing mechanism.

Referring to the drawings, the toaster is provided with a plastic base 10 with a cover or appearance housing 11 mounted thereon to cover the mechanism and toasting compartments. The appearance housing 11 is provided with two toast receiving openings 12 as clearly shown in Figures 1 and 2.

A plate 13 (Fig. 2) is mounted on the base 10 and forms the support for the entire mechanism within the appearance housing 11.

Rigidly secured to a depressed portion of the supporting plate 13 are a pair of vertically extending parallel posts 14 which form guides for the toast carriers 15 (Fig. 4) lying immediately below the toast receiving openings 12.

The toast carriers 15 are movable from an upper bread receiving position, in which toast resting on the carriers 15 will project slightly through the openings 12, to a lower toasting position, between spaced heaters as is well known in the art.

Rigid with the toast carriers 15 is an upwardly extending plate 16 which forms a support for four guide rollers 17 (Fig. 2) which cooperate with the posts 14 to guide the toast carriers as they are moved from the upper bread receiving position to the lower toasting position.

Figure 4:
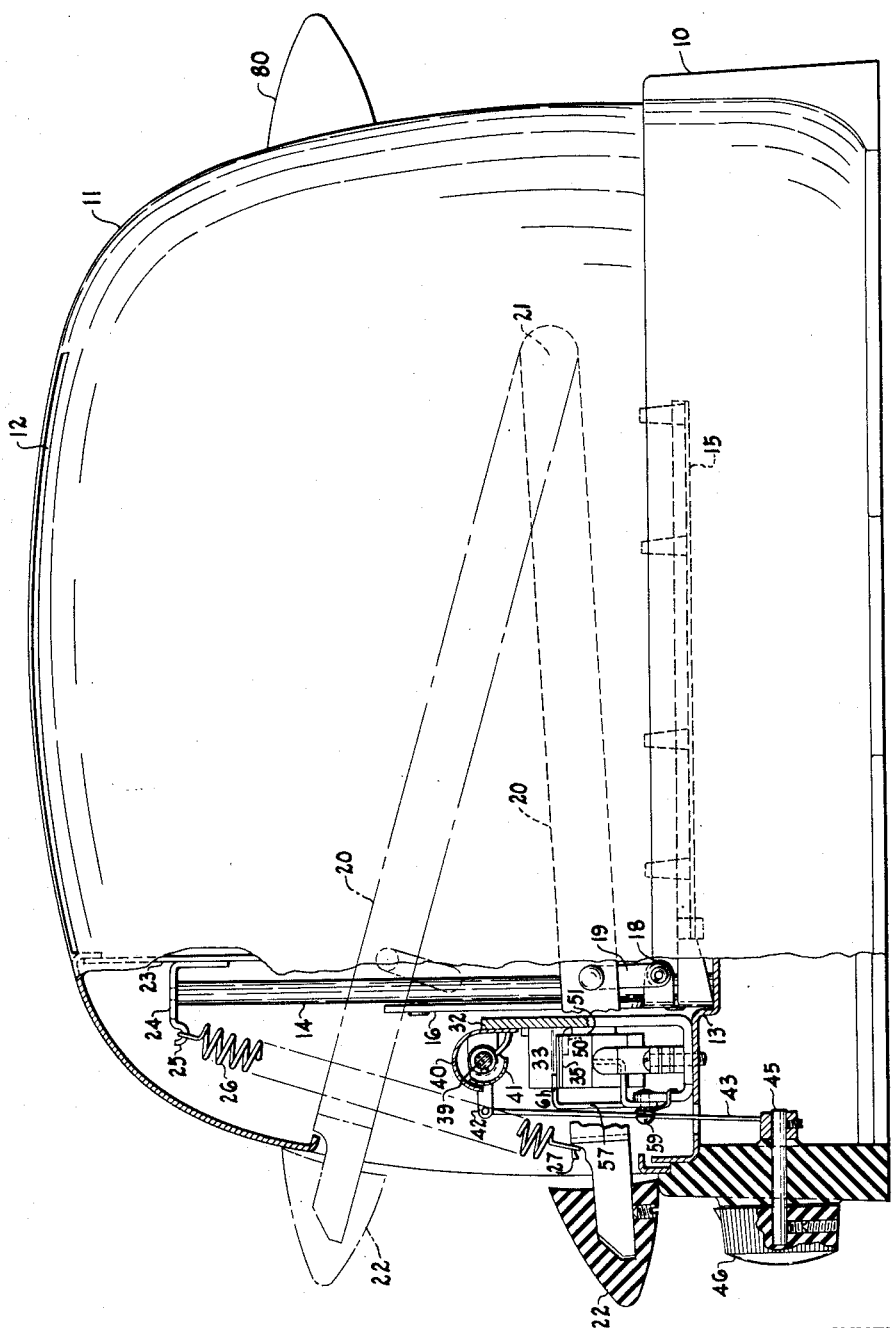
Figure 4 is a side plan view of a toaster showing a cross-sectional view of the timing mechanism of this invention taken on line 4—4 of Figure 2.
Figure 5:
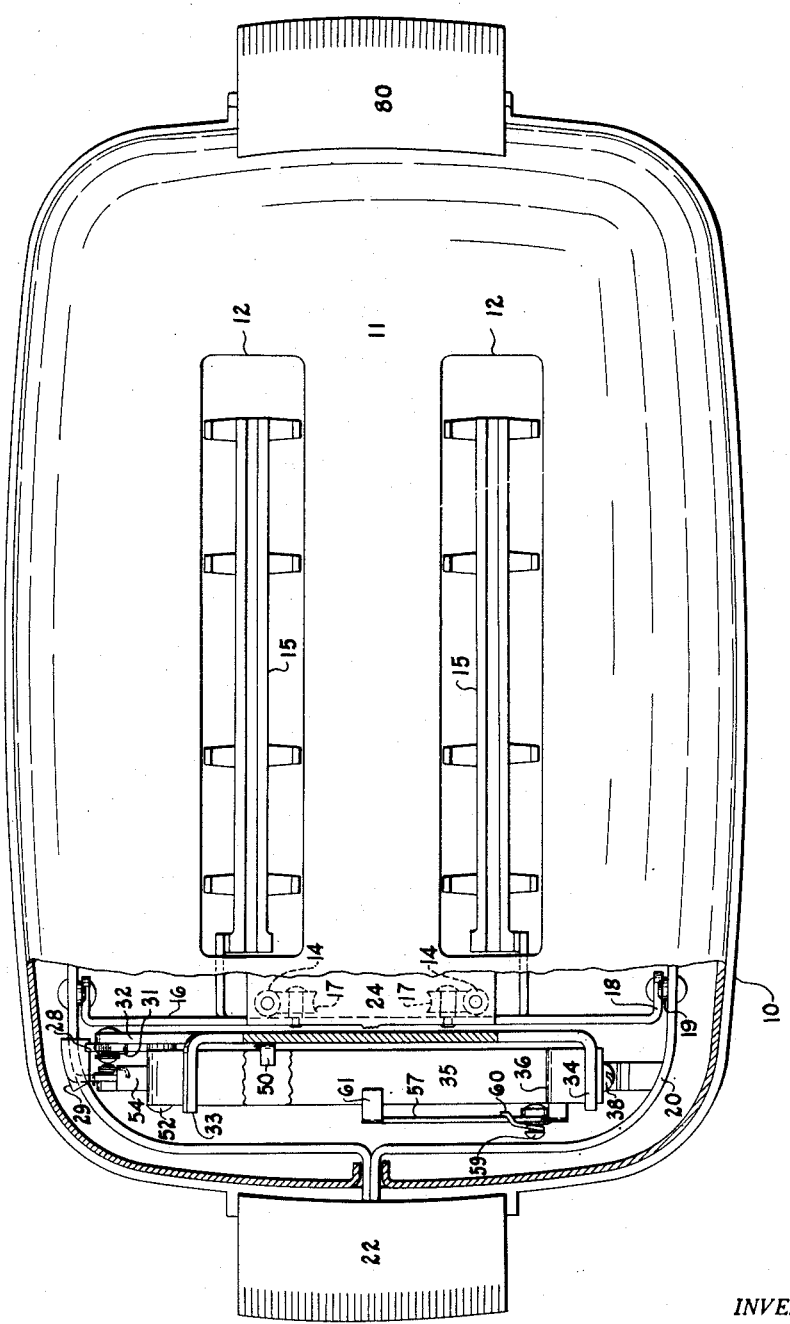
Figure 5 is a top plan view of a toaster with the parts broken away to show the timing mechanism according to this invention.

Mounted on the plate 16 and extending rearwardly therefrom are a pair of lugs 18. Pivoted to these lugs 18 are a pair of links 19, which at their upper ends are pivoted to the arms of a U-shaped operating lever 20, which in turn is pivoted to the walls of the toast chamber as at 21 (Figs. 1 and 4). A handle 22 is attached to the front of the lever 20 for manual operation of the lever. The links 19 permit the carriers 15 to move in a straight line vertical direction while the front of the lever 20 is moving in the arc of a circle about pivot points 21.

Extending upwardly from the supporting plate 13 is a partition 23 which separates the toasting chambers from the mechanism compartment. Attached to the partition 23 is an L-shaped bracket 24 which anchors the upper ends of the guide posts 14 and at its forward edge is provided with a hook 25 which forms the upper anchorage for a tension spring 26 (Fig. 4) secured at its lower end to a hook 27 on the lever 20.

The bread receiving position of the lever 20 is shown in dot-dash line of Fig. 4 and its toasting position is shown in full lines. In operation the operator inserts bread through the receiving openings 12, grasps the handle 22 and moves the lever 20 together with the toast carriers 15 to toasting position against the tension of the spring 26.

When the lever 20 is moved to toasting position it is latched in that position by the latch 28 which cooperates with a ledge 29 extending from the lever 20.

The latch 28 is pivotally mounted on a plate 32 extending upwardly from the supporting plate 13 and is spring biased by the spring 31 into latching position.

Slots 49 are provided in the front plate 23 in which the two arms on the lever 20 reciprocate as the arm is moved upwardly and downwardly.

The plate 32 is rigidly secured to the supporting plate 13 and supports the timing mechanism. The plate 32 has inturned portions 33, 34 which support the opposite ends of a bimetal timer 35 so constructed that when it is cold it moves in an upward direction to an upper stable bowed position and when hot moves in a downward direction to a lower stable bowed position.

A factory adjustment for the bimetal timer 35 comprises a channel-shaped member 36, supporting one end of the bimetal timer 35, a compression spring 37 and an adjusting screw 38 threaded through the lug 34. In moving from its upper stable bowed position to its lower stable bowed position and vice versa, the bimetal 35 moves through an unstable position and is snapped to its opposite stable position by the spring 37.

An auxiliary heater 39, in the form of a wire spirally wound on a ceramic core, is positioned immediately above the bimetal timer 35 and a curved reflector 40 is positioned above the heater 39 to reflect heat therefrom to the bimetal timer 35.

In order to control the amount of heat transmitted from the heater 39 to the bimetal 35, a curved shield 41 is rotatably mounted inside the reflector 40. The shield 41 is so mounted as to be moved to a position entirely within the reflector 40 so that all of the heat from the heater 39 may be reflected to the bimetal timer 35 or to a position more or less between the heater 39 and the bimetal 35 so as to cut off radiation of the heat from the heater 39 to the bimetal 35. The inner surface of the shield 41 is also made reflecting so as to act as a substitute for the reflector 40 when it is moved to a position within the reflector.

In order to manually control the operation of the shield 41, a lug 42 extends from the shield 41 beyond its pivot point. The lug 42 is connected by a link 43 to an arm 44 (Fig. 1) extending from a shaft 45 rotatably mounted on the base 10 and extending to the outside thereof. A knob 46 is mounted on the shaft 45 exteriorly of the base 10 making it possible to manually adjust the timer to prepare light, medium or dark toast as desired. The indicia D, L, M (Fig. 1) indicates the control positions for dark, light and medium toast respectively.

As previously stated, the bimetal timer 35 is constructed to move to a downwardly bowed position when hot and to an upwardly bowed position when cool. As the bimetal timer 35 is heated from its cold position, it moves slowly downwardly until it reaches its midpoint of movement when a condition of unstability occurs and it snaps rapidly to downwardly bowed position due to the compressive stress of the spring 37.

As the bimetal timer 35 snaps to its downwardly bowed position, it contacts the end 50 (Fig. 1) of the latch 28 and releases the toast carriers 15 for upward movement under the tension of the spring 26.

A cooling block 51 of high thermal mass, having good heat dissipating properties, is pivoted at 52 on the plate 32 so as to be capable of movement into contact with the bimetal timer 35 when the bimetal is hot.

An arm 53 is secured on the lever 20 as shown at the left of Fig. 1. At its inner end the arm 53 carries a camming link 54 having a cam face 55 which cooperates with a cam face 56 on the cooling block 51. The camming link 54 is so mounted on the end of the arm 53 so as to be spring biased in an upward direction and so that it cannot move relative to the arm 53 in an upward direction, but is free to pivot downwardly against the action of the biasing spring.

A latch lever 57 (Figs. 1 and 2) having a latching point 58 is pivoted at 59 to a lug extending upwardly from the supporting plate 13 and is spring biased in a counter-clockwise direction to latching position by a spring 60.

The latch lever 57 has an extension 61 overlying the central portion of the bimetal timer 35 so that when the bimetal 35 is cool and in upwardly bowed position the point 58 of the latch lever will clear the end 62 of the cooling block 51. When the bimetal 35 is hot and in downwardly bowed position, the point 58 of the latch lever 57 will lie beneath the end 62 of the cooling block 51 so as to hold the cooling block in contact with the bimetal timer 35 until it has cooled sufficiently to snap to its upwardly bowed position to contact portion 61 of the lever 57 and move the point 58 of the latch lever 57 from beneath the end 62 of the cooling block 51. This allows the cooling block 51 to drop by gravity out of contact with the bimetal timer 35. A suitable stop may be provided to limit the downward movement of the cooling block 51 under the action of gravity.

The electric switch for controlling the operation of the main heaters H and the auxiliary heater 39 comprises two contacts 70, 71 (Figs. 2 and 3) mounted on spring arms 72, 73 respectively. In normal unstressed position the spring 72 maintains the contact 70 in the position shown in Fig. 2 and the spring 73 maintains a contact 71 in the position shown in dotted lines of Fig. 3.

Figure 2:
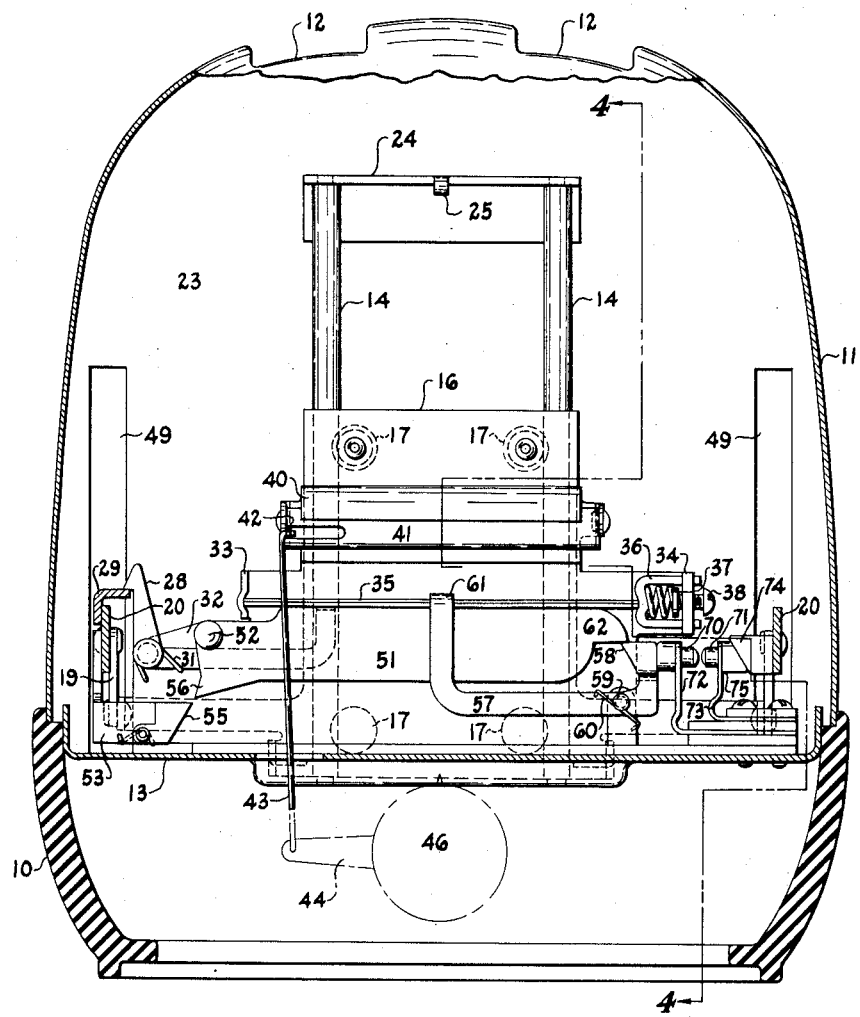
Figure 2 is a cross-sectional view of a toaster showing a front plan view of the timing mechanism of this invention.

A cam 74 is carried by one of the arms of the lever 20 and cooperates with a cam 75 on the spring 73 to move the contact 71 into the position shown in Fig. 2 when the arm 20 and the carriers 15 are moved to downward position. When the bimetal timer 35 cools and snaps to its upward bowed position it moves the rocker arm 57 about its pivot simultaneously releasing the cooling block 51 and moving the spring arm 72 into the position shown in dotted lines of Fig. 3, thus closing the contacts 70, 71 to simultaneously energize the main heaters H and the auxiliary heater 39.

A handle 80 (Fig. 4) is secured to the appearance housing 11 opposite the handle 22 and about at the same height as handle 22 when it is in its upward position. These handles may then serve as carrying handles when the device is not in operation.

*Operation.*—With the handle 22 in its upward position and the bread carriers 15 in their toast receiving position, the operator adjusts for light, medium or dark toast as desired by rotating the adjusting knob 46 to the proper position and inserts bread slices through the openings 12 so that the slices rest on the carriers 15 and project slightly above the appearance housing 11.

The operator then moves the handle 22 to its downward position as shown in Fig. 4 against the tension of the spring 26 causing the latch 28 to snap over the ledge 29 and latch the bread carriers 15 in their toasting position.

Due to the fact that the bimetal timer 35 is cool at this time the cooling block 51 will merely move upwardly to the position shown in Fig. 4 and drop down again as soon as the cam faces 55 and 56 clear each other.

Figure 3:
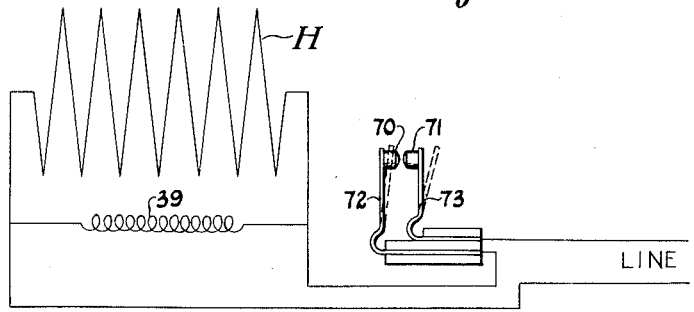
Figure 3 shows a circuit diagram of the toaster according to this invention.

At this time the bimetal timer 35, being in its upper cold position, will hold the spring arm 72 in the dotted line position shown in Fig. 3. As the lever 20 and the carriers 15 move to their downward position, the cam 74 coacting with the cam 75 will move the spring arm 73 from the position shown in dotted lines of Fig. 3 to the position shown in Fig. 2 and immediately close the contacts 70 and 71 to energize the main heaters H and the auxiliary heater 39 and initiate the first toasting operation.

A portion of the heat generated by the auxiliary heater 39 will be radiated directly to the bimetal timer 35. Another portion will be reflected to the bimetal timer 35 by means of the reflector 40. Preferably the bimetal timer 35 has its surfaces blackened so as to absorb heat more rapidly upon heating and to radiate it more rapidly in cooling.

If at this time the toaster has been set for dark toast as in Fig. 4, the shield 41 will prevent a major portion of the heat rays from the auxiliary heater 39 from being projected to the bimetal timer 35. If the toaster is set for medium toast, the shield 41 will be positioned upwardly somewhat from the position shown in Fig. 4 so that a greater portion of the heat from the auxiliary heater 39 will be transmitted to the bimetal timer 35. If the toaster is set for light toast the shield will be moved to a position within the reflector 40 so that practically all of the heat from the auxiliary heater 39 will be transmitted to the bimetal timer 35.

The auxiliary heater 39 having been energized simultaneously with the main heaters H, the bimetal timer 35 will become progressively hotter as the bread is toasted. As the bimetal timer 35 is heated it slowly moves in a downward direction compressing the spring 37 until it reaches dead center position when it snaps to its downwardly bowed position under the influence of the spring 37. In moving to its downward bowed position the bimetal timer 35 contacts the end 50 of the latch lever 28 to release the latch.

The bread carriers 15 and their associated parts are then moved upwardly to non-toasting position under the influence of the spring 26. The cams 74, 75 will be disengaged and the spring arms 72, 73 will open the contacts 70, 71 deenergizing the entire toaster. When the carriers 15 move upwardly the camming link 54 on the arm 53 contacts the lower edge of the cam face 56 on the cooling block 51 and is pivoted downwardly against the action of its biasing spring until the two parts clear each other leaving the carriers 15 free to move upwardly.

If desired, suitable buffer springs or a dash pot mechanism may be provided to take up the shock as the bread carriers 15 and their associated parts are moved to upward position. Also, if desired, a manually operable lever having a portion extending outside the appearance housing 11 may be provided for releasing the latch 28 for manual inspection of the toast at any time during the toasting period.

If now a second toasting operation is immediately initiated the bimetal timer 35 will not have been cooled sufficiently to have moved to its upper bowed position. Under these conditions, movement of the toast carriers 15 and the lever 20 to lowered position will cause the cam face 55 to coact with the cam face 56 to move the cooling block 51 into contact with the bimetal timer 35 and force it into a position just below its dead center position so that the bimetal 35 will clear the end 50 of the latch 28 and permit the latch to hold the carriers in downward position even though the bimetal 35 is still hot. This will quickly cool the bimetal timer 35 so that it will quickly snap to its upwardly bowed position.

It is to be noted that even though the bimetal timer 35 has not cooled so as to move to its upwardly bowed position the latch 28 nevertheless is operative to hold the carriers 15 in their downward toasting position.

The above feature of latching the carriage in downward position even though the bimetal timer 35 has not cooled forms no part of this invention, except in combination with the cooling block 51, but is disclosed and claimed in an application of Dale C. Gerber, Serial No. 719,506, filed December 31, 1946, concurrently herewith.

The use of the cooling block 51 of this invention with the invention claimed in the above mentioned application materially shortens the time interval between the movement of the carriers to toasting position and the actual beginning of the toasting operation when the bimetal 35 is hot when the carriers are moved to downward position.

In snapping to its upward bowed position the bimetal timer 35 contacts the end 61 of the lever 57 so as to move its end 58 from beneath the end 62 of the cooling block 51 so as to permit the cooling block 51 to move away from the bimetal 35 under the action of gravity so that the cooling block 51 will be cool for the next succeeding operation.

The movement of the lever 57 to its upward position also moves the spring arm 72 to the dotted line position in Fig. 3 so as to close the contacts 70, 71 and automatically initiate a second toasting operation without any further attention from the operator.

The thermal timer of this invention is self-compensating in that the thermal mass of the heater 39, bimetal 35, cooling block 51, etc. is so related to the thermal mass of the toaster as a whole that they heat up and cool off at substantially the same rate. Thus, if the toaster is hot, the timing mechanism is also hot and the toasting period will be reduced to automatically compensate for the shortened toasting period necessary to toast bread to the required degree.

While the thermally responsive element 35 is always cooled at the beginning of each succeeding toasting operation, the cooling block 51 will retain some heat. Further, the other parts of the timer such as the auxiliary heater 39, reflector 40, shield 41, etc. will have heat stored therein and become progressively hotter. This will cause the timer to have a tendency to over-compensate when the toaster is operated in rapid succession.

However, the compression spring 37 aids in this regard. As the toaster as a whole heats up the spring 37 becomes elongated and applies more pressure to the end of the bimetal 35 so that a greater temperature difference is required to snap it to its downward hot position. This will automatically compensate for the tendency of the thermal timer to over-compensate.

In prior thermal timers where a tension spring has been used, the progressive heating up of the toaster and timer causes less and less pressure to be applied to the ends of the bimetal as the tension spring becomes expanded and the timer eventually fails to function properly.

Further, according to this invention, the cooling block in being moved away from the bimetal when the bimetal has become cooled and has moved to its upwardly bowed position always assures that the cooling block will be cool for efficient operation in cooling the bimetal when occasion demands. In prior devices, where the cooling block is fixed relative to the bimetal, heat is transmitted from the bimetal to the cooling block as the bimetal is heated. Accordingly, the cooling block is at a comparatively high temperature at the very time its greatest cooling effect is needed. That drawback is obviated by the movable cooling block of this invention.

While I have shown and described but a single modification of my invention, it is to be understood that this modification is to be taken as illustrative only and not in a limiting sense. I do not wish to be limited to the particular structure shown and described, but to include all equivalent variations thereof except as limited by the scope of the claims.

I claim:

1. A toaster including bread carriers movable from an upper bread receiving position to a lower toasting position and spring biased to bread receiving position, means for moving said bread carriers to toasting position, a latch for holding said bread carriers in toasting position, thermal means for controlling the duration of the toasting operation, a cooling block mounted adjacent to said thermal means, said cooling block being so mounted as to be movable into and out of contact with said thermal means and means operable by movement of said bread carriers to toasting position for moving said cooling block.

2. A toaster including bread carriers movable from an upper bread receiving position to a lower toasting position and spring biased to bread receiving position, manually operable means for moving said bread carriers to toasting position, a latch for holding said bread carriers in toasting position, thermal means for controlling the duration of the toasting period, a cooling block mounted adjacent to said thermal means, said cooling block being so mounted as to be movable into and out of contact with said thermal means, means operable by movement of said bread carriers to toasting position for moving said cooling block into contact with said thermal means, a latch for holding said cooling block in contact with said thermal means and means operable by said thermal means for releasing said second mentioned latch.

3. A toaster including bread carriers movable from an upper bread receiving position to a lower toasting position and spring biased to bread receiving position, manually operable means for moving said bread carriers to toasting position, a latch for holding said bread carriers in toasting position, thermal means for controlling the duration of the toasting operation, a cooling block mounted adjacent to said thermal means, said cooling block being so mounted as to be movable into and out of contact with said thermal means, means operable by movement of said bread carriers to toasting position for moving said cooling block into contact with said thermal means, a latch for holding said cooling block in contact with said thermal means and means operable by said thermal means for releasing both of said latches.

4. A toaster including bread carriers movable from an upper bread receiving position to a lower toasting position and spring biased to bread receiving position, manually operable means for moving said bread carriers to toasting position, a latch for holding said bread carriers in toasting position, thermal means for controlling the duration of the toasting operation, a cooling block mounted adjacent to said thermal means, said cooling block being so mounted as to be movable into and out of contact with said thermal means, means operable by movement of said toast carriers to toasting position for moving said cooling block into contact with said thermal means, a latch for holding said cooling block in contact with said thermal means, said thermal means having a cold position and a hot position, means operated by movement of said thermal means to cold position for releasing said second latch and means operated by movement of said thermal means to its hot position for releasing said first latch.

5. A toaster including bread carriers movable from a bread receiving position to a toasting position, a thermal timer for controlling the duration of the toasting period, said thermal timer being movable from a cold position of stability to a hot position of stability in passing through a position of unstability and vice versa, means for moving said carriers to toasting position, means for latching said carriers in toasting position whether said thermal timer is in its hot or cold position of stability and means operable by movement of said carriers to toasting position for moving said thermal timer from its hot position of stability toward its position of unstability, said last mentioned means including a cooling block movable into contact with said thermal timer if it is in its hot position when said carriers are moved to toasting position.

6. A toaster including bread carriers movable from a bread receiving position to a toasting position, a thermal timer for controlling the duration of the toasting period, said thermal timer being movable from a cold position of stability to a hot position of stability in passing through a position of unstability and vice versa, means for moving said carriers to toasting position, means for latching said carriers in toasting position whether said thermal timer is in its hot or cold position of stability and means operable by movement of said carriers to toasting position for moving said thermal timer from its hot position of stability toward the position of unstability, said last mentioned means including a cooling block movable into contact with said thermal timer if it is in hot position when said carriers are moved to toasting position but being inoperative to move into contact with said thermal timer when said timer is in its cold position.

7. A toaster including bread carriers movable from a bread receiving position to a toasting position, main heaters for performing the toasting function, a thermal timer for controlling the duration of the toasting period, an auxiliary heater for said thermal timer, said thermal timer being movable from a cold position to a hot position as it is heated and back to its cold position when cooled, an electric switch for simultaneously energizing said main and auxiliary heaters, means for moving said carriers to toasting position, means operable by movement of said carriers to toasting position for closing said switch if said thermal timer is in its cold position and for conditioning said switch for final closing movement if said thermal timer is in its hot position, means operable by movement of said thermal timer to its cold position for finally closing said switch if the thermal timer is in its hot position when the bread carriers are moved to toasting position, a cooling block movably mounted adjacent to said thermal timer and means operated by movement of said carriers to toasting position for moving said cooling block into contact with said thermal timer when said thermal timer is in its hot position.

8. A toaster including bread carriers movable from a bread receiving position to a toasting position, main heaters for performing the toasting function, a thermal timer for controlling the duration of the toasting period, an auxiliary heater for said thermal timer, said thermal timer being movable from a cold position to a hot position as it is heated and back to its cold position when cooled, an electric switch for simultaneously energizing said main and auxiliary heaters, means for moving said carriers to toasting position, means operable by movement of said carriers to toasting position for closing said switch if said thermal timer is in its cold position and for conditioning said switch for final closing movement if said thermal timer is in its hot position, a cooling block movably mounted adjacent said thermal timer, means operated by movement of said carriers to toasting position for moving said cooling block into contact with said thermal timer when it is in its hot position, a latch for holding said cooling block in contact with said thermal timer and means operated by movement of said thermal timer from its hot position to its cold position for releasing said latch and closing said previously conditioned switch.

9. A self compensating thermal timer comprising; a bimetallic strip; supports at opposite ends of said strip; one of said supports including a follower engaging the end of said strip, a compression spring having one end acting on said follower and adjustable means for applying a force at the opposite end of said spring to provide a factory adjustment; said supports and strip being so constructed and arranged that the strip will snap from a first stable bowed position on one side of said supports to a second bowed stable position on the opposite side of said supports as it is heated and back to its first stable position when it is cooled; a cooling block movably mounted adjacent to said strip and means for moving said cooling block into contact with said strip when said strip is in its hot position of stability.

10. A toaster including bread carriers movable from a bread receiving position to a toasting position, main heaters for performing the toasting function, a self compensating thermal timer for controlling the duration of the toasting period, an auxiliary heater for said thermal timer, said thermal timer comprising a bimetallic strip supported at its ends and free to move to opposite bowed positions of stability in moving through an unstable position as it is heated and cooled, said supports including a compensating compression spring applying pressure to one end of said strip tending to hold it in its stable positions and to snap it from its unstable position to its stable positions upon heating and cooling, an electric switch for simultaneously energizing said main and auxiliary heaters, means actuated by movement of said carriers to toasting position for conditioning said switch for closing movement, means actuated by movement of said strip to its cold stable position for finally closing said switch and means actuated by movement of said carriers to toasting position for cooling said strip when it is in its hot position.

11. A toaster including bread carriers movable from an upper bread receiving position to a lower toasting position and spring biased to bread receiving position, manually operable means for moving said bread carriers to toasting position, thermal means for controlling the duration of the toasting period, a cooling block mounted adjacent to said thermal means, said cooling block being so mounted as to be movable into and out of contact with said thermal means, means operable by movement of said bread carriers to toasting position for moving said cooling block into contact with said thermal means, latch means for holding said carriers in toasting position and said cooling block in contact with said thermal means and means operable by said thermal means for releasing said latch means.

12. A toaster including bread carriers movable from a bread receiving position to a toasting position, a thermal timer for controlling the duration of the toasting period, said thermal timer being movable from a cold position of stability to a hot position of stability in passing through a position of unstability and vice versa, means for moving said carriers to toasting position and means operable by movement of said carriers to toasting position for moving said thermal timer from one of its stable positions towards its position of unstability, said last mentioned means including a cooling block movable into contact with said thermal timer.

13. A toaster including bread carriers movable from a bread receiving position to a toasting position, a thermal timer for controlling the duration of the toasting period, said thermal timer being movable from a cold position of stability to a hot position of stability in passing through a position of unstability and vice versa, means for moving said carriers to toasting position, means operable by movement of said carriers to toasting position for moving said thermal timer from one of its positions of stability toward its position of unstability, said last mentioned means including a cooling block movable into contact with said thermal timer, means for latching said cooling block in contact with said thermal timer and means actuatable by movement of said thermal timer past its position of unstability for releasing said latch.

14. A self compensating thermal timer comprising; a bimetallic strip; supports at opposite ends of said strips; one of said supports including a follower engaging the end of said strip, a compression spring having one end acting on said follower and adjustable means for applying a force to the opposite end of said spring to provide a factory adjustment; said supports and strips being so constructed and arranged that the strip will snap from a first stable bowed position on one side of said supports to a second bowed stable position on the opposite side of said supports as it is heated and back to its first stable position when it is cooled; a cooling block movably mounted adjacent to said strip and means for moving said cooling block into contact with said strip when said strip is in one of its stable positions.

GEORGE P. DAIGER.

REFERENCES CITED

The following references are of record in the file of this patent:

UNITED STATES PATENTS

| Number | Name | Date |
|---|---|---|
| 2,099,210 | Ireland | Nov. 16, 1937 |
| 2,167,127 | McCreary et al. | July 25, 1939 |
| 2,250,979 | Winborne | July 29, 1941 |
| 2,269,162 | Newell | Jan. 6, 1942 |
| 2,303,561 | Koci | Dec. 1, 1942 |